United States Patent
Hoekstra-Suurs

(10) Patent No.: US 12,075,789 B2
(45) Date of Patent: Sep. 3, 2024

(54) METHOD AND PRODUCT LINE FOR IN-LINE PROCESSING OF FOOD PRODUCTS

(71) Applicant: MAREL FURTHER PROCESSING B.V., Boxmeer (NL)

(72) Inventor: Patricia Hoekstra-Suurs, Boxmeer (NL)

(73) Assignee: MAREL FURTHER PROCESSING B.V., Boxmeer (NL)

( * ) Notice: Subject to any disclaimer, the term of this patent is extended or adjusted under 35 U.S.C. 154(b) by 429 days.

(21) Appl. No.: 17/254,447

(22) PCT Filed: Jul. 4, 2019

(86) PCT No.: PCT/NL2019/050410
§ 371 (c)(1),
(2) Date: Dec. 21, 2020

(87) PCT Pub. No.: WO2020/009573
PCT Pub. Date: Jan. 9, 2020

(65) Prior Publication Data
US 2021/0267220 A1    Sep. 2, 2021

(30) Foreign Application Priority Data

Jul. 4, 2018  (NL) ..................................... 2021242

(51) Int. Cl.
| | | |
|---|---|---|
| A22C 11/00 | (2006.01) | |
| A22C 13/00 | (2006.01) | |
| A23L 5/10 | (2016.01) | |
| A23L 13/40 | (2023.01) | |
| A23L 13/60 | (2016.01) | |
| A23P 30/25 | (2016.01) | |

(52) U.S. Cl.
CPC .......... *A22C 11/00* (2013.01); *A22C 13/0006* (2013.01); *A23L 5/19* (2016.08); *A23L 13/42* (2016.08); *A23L 13/65* (2016.08); *A23P 30/25* (2016.08); *A22C 2013/0023* (2013.01)

(58) Field of Classification Search
CPC . A23L 13/65; A23L 5/19; A23L 13/42; A22C 13/0006; A22C 11/00; A22C 13/0016; A23P 30/25; A23B 4/0053
See application file for complete search history.

(56) References Cited

U.S. PATENT DOCUMENTS

| | | |
|---|---|---|
| 3,622,353 A | 11/1971 | Sharnbrook |
| 6,419,968 B1 | 7/2002 | Wang et al. |
| 8,945,643 B2 | 2/2015 | Carlson et al. |
| 2008/0254176 A1 | 10/2008 | Bontjer et al. |
| 2010/0047400 A1 | 2/2010 | Carlson et al. |
| 2011/0070338 A1 | 3/2011 | Carlson |
| 2016/0050963 A1 | 2/2016 | Du Preez et al. |
| 2017/0273340 A1 | 9/2017 | Du Preez et al. |
| 2018/0103664 A1 | 4/2018 | Nielsen |

FOREIGN PATENT DOCUMENTS

| | | |
|---|---|---|
| JP | 2009507487 A | 2/2009 |
| JP | 2017526349 A | 9/2017 |
| JP | 2018512852 A | 5/2018 |
| NL | 6909339 A | 12/1969 |
| WO | 2007032678 A1 | 3/2007 |
| WO | 2015142167 A1 | 9/2015 |

OTHER PUBLICATIONS

Office Action from corresponding Japanese Application No. 2020-573479, Apr. 25, 2020.
Brazilian Office Action from corresponding BR Application No. BR112020025042-2, Jun. 19, 2023.
International Search Report and Written Opinion from PCT Application No. PCT/NL2019/050410, Nov. 11, 2019.
Search Report and Written Opinion from corresponding NL Application No. NL2021242, Mar. 6, 2019.

*Primary Examiner* — Vera Stulii
(74) *Attorney, Agent, or Firm* — Workman Nydegger

(57) ABSTRACT

The present invention relates to a method and production line for in-line processing of food products. The method comprises the step of co-extruding a food dough into a flow of co-extruded food products having a casing that comprises a protein, or a hybrid casing of a protein and a polymer, wherein the method subsequently comprises the successive steps of: a) subjecting the flow of co-extruded food products to a surface treating step, b) subjecting the flow of food products to a thermal treating step, and c) optionally, subjecting the thermally treated flow of food products to a post-thermal treating step, wherein in step b) the flow of food products is at least subsequently subjected to a first thermal treating step, and a second thermal treating step.

19 Claims, No Drawings

METHOD AND PRODUCT LINE FOR IN-LINE PROCESSING OF FOOD PRODUCTS

FIELD OF THE DISCLOSURE

The present invention relates to a method for in-line processing of food products and a product line for in-line processing of food products. In particular the present invention relates to a method for in-line processing of food products, comprising the step of co-extruding a food dough into a flow of co-extruded food products having a casing that comprises a protein, or a hybrid casing of a protein and a polymer.

BACKGROUND

Methods of co-extrusion in food products are generally known and described in, among others, Dutch patent NL 6909339. This document describes the casing of a strand of food dough with a casing layer of protein, e.g. collagen, by means of co-extrusion. Following extrusion the coated strand is guided for strengthening purposes through a coagulation bath. Under the influence of the coagulation solution the protein coagulates and/or precipitates and the casing layer is strengthened. A strand of food dough is thus formed which is at least partially coated with a strong casing layer of protein, i.e. a collagen comprising casing.

A drawback of the known methods is that the characteristics of the casing material, and therefore the processability of the food product, may change during the manufacturing of the flow of co-extruded food products, i.e. a flow of individual sausages, a strand of food products or a flow of sausages connected to each other (head-tail connections). The change in the characteristics of the casing material is difficult to predict. Even further, the change in the characteristics of the casing material is irreversible. Therefore, once the characteristics of the casing material have been changed the flow of food products can no longer be processed to obtain a final food product, i.e. a sausage, having an acceptable quality.

A particular drawback of the known methods using protein or protein comprising viscous gelling agent as a casing material for the co-extrusion of elongated food products are the uncontrolled properties (especially the surface conditions) of the final food products. It has been observed that by changing the process settings after co-extrusion of the strand of food dough and the casing material, the characteristics of the protein casing material may irreversibly change. The change may include the change of surface characteristics of the casing material with regard to smoothness of the surface of the food product, i.e. the "look-and-feel" of the food product. By changing the process settings after co-extrusion in subsequent processing steps, such as brining, separating, crimping, smoking, drying, packaging, cooking and/or chilling of the co-extruded elongated food product, the obtained food product may, different from the normally desired smooth, nice looking and stable surface, uncontrolled change into a food product with undesired surface conditions like e.g. sticky, inconsistent and/or smudgy surfaces. Such uncontrolled irreversible change in surface characteristics results in the less processability of the flow of food products and, as a consequence, the flow of food products (or at least a part of the flow of food products) may even have to be discarded.

In view of the above there is a need to enhance the control of the production of co-extruded food products, and more specific to enhance the control of the product characteristics of the casing material during the manufacturing and the further life stages of the food products.

DETAILED DESCRIPTION OF VARIOUS EMBODIMENTS

The present invention provides for this purpose a method for in-line processing of food products, comprising the step of co-extruding a food dough into a flow of co-extruded food products having a casing that comprises a protein, or a hybrid casing of a protein and a polymer, wherein the method subsequently comprises the successive steps of:

a) subjecting the flow of co-extruded food products to a surface treating step, said surface treating step comprises the step of subjecting the flow of food products to a food product strengthening step, such as subjecting the flow of food products to a brine solution;

b) subjecting the flow of food products obtained in step a) to a thermal treating step; and c) optionally, subjecting the thermally treated flow of food products to a post-thermal treating step, said post-thermal treating treatment is selected from the group consisting of chilling, surface treating, cooking and packing the flow of food products, wherein in step b) the flow of food products is at least subsequently subjected to a first thermal treating step, and a second thermal treating step. It was found that the processability of the co-extruded elongated food product and the unexpected irreversible change in casing characteristics strongly depends on the physical state of the protein or hybrid casing comprising the protein. As a consequence, by controlling the physical state of the protein, the change in casing characteristics, such as smoothness of the surface of the casing, can be controlled, i.e. prevented. In particular it was found that by providing the multiphase thermal treating step of step b), the physical state of the protein can be controlled in a more sustainable and controllable way. Typically, different thermal treating steps, e.g. drying, heating and cooking the flow of food products, are applied throughout the method for processing of food products. By combining the different thermal treating steps into a single multiphase process step, the physical state of the protein is controlled in a more sustainable and reliable way, i.e. to produce a partially or fully cooked product with appealing characteristics, e.g. a product with a smooth, non-sticky, non-smudgy surface having good texture properties. Even further it was found that by combining the different thermal treating steps into a single multiphase process step, the thermal treating steps can be performed in a much shorter timespan compared to the timespan needed to perform the thermal treating steps separately (at the different stages throughout the method for processing of food products). Also it is noted that by providing a single multiphase thermal treating step it is now possible to better control, i.e. to steer, the texture characteristics of the food product to be obtained. For example, by providing the method of the present invention pressure on the food dough throughout the process, e.g. pressure exerted by the uncontrolled or too much shrinkage of the protein (e.g. collagen) in the casing as a result of the chosen heating strategy (e.g. the amount and duration of drying and cooking steps), is herewith prevented. Such uncontrolled shrinkage of the protein is prevented by the single multiphase thermal treating step of the present invention, resulting in better controllable food products and steering the final food product characteristics of the food products to be obtained.

With regard to the physical state of the protein, it is noted that such physical state may include three types of physical states: the crystalline phase, the helical phase and the randomly coiled phase. It was found that the irreversible change in casing characteristics is expected in case a protein in the helical or crystalline form is converted into a protein having a randomly coiled form. The protein comprising casing of the food product comprising a protein in the helical or crystalline form is characterized by a smooth, attractive looking and/or stable surface, whereas the protein comprising casing of the food product comprising a protein in the randomly coiled form exhibits a more sticky, inconsistent and/or smudgy surface. As a consequence, in an embodiment of the method of the present invention, the protein is in the helical and/or crystalline form.

In an embodiment of the present invention, during performance of the method of the present invention the physical state of the protein may vary between the helical and crystalline form during the thermal treating step and optional post-thermal treating steps. Since either the helical or crystalline physical state of the protein have a positive effect onto the casing characteristics of the food product, the actual state of the protein may vary between those two states. However, it in particular it is preferred that the physical state of the protein does not change after co-extruding the flow of food products. To maintain the same product characteristics, such as surface smoothness, surface colour, cooking characteristics of the obtained food product, or the like, it is in particular advantageous to maintain the same physical state of protein during the co-extrusion of the flow of food products and any further processing step. Even further, particular good results are obtained with a protein that is in the crystalline form throughout the method of the present invention. By providing a casing comprising a protein that is in the crystalline form, the casing of the food product has the most optimal thermal stability, i.e. providing a product that can be partially or fully cooked without having undesired surface characteristics.

In order to maintain the physical state of the protein in a preferred phase, i.e. the helical and crystalline phase, in particular a method wherein the flow of food products is subjected to the second thermal treating step in case the surface temperature of the food products is at least about 55° C. is preferred. By providing a method wherein during the first thermal treating step the surface temperature of the flow of food products is raised to at least about 55° C. before subjecting the flow of food products to a second thermal treating step, the crystalline or helical phase can be maintained and controlled during further processing steps. In a preferred embodiment, a method of the invention is provided wherein during the first thermal treating step the surface temperature of the flow of food products is raised to at least about 58° C. before subjecting the flow of food products to a second thermal treating step. In an even further preferred embodiment, a method of the invention is provided wherein during the first thermal treating step the surface temperature of the flow of food products is raised to at least about 60° C. before subjecting the flow of food products to a second thermal treating step.

It is noted that the term 'surface treating step' as used herein refers to a treating step of the flow of food products devoid of/not including any thermal treating step. In other words, the 'surface treating step' of step a) of the present invention does not include pre-drying or drying steps, let alone further thermal treating steps such as cooling or cooking.

It is further noted that the term 'thermal treating step' as used herein refers to a step wherein the flow of food products is actively heated or cooled during the processing of the flow of food products. Any temperature changes due to temperature differences between the flow of food products and the ambient temperature (e.g. temperature of the production facility or the like) do not within the scope of the term 'thermal treating step' as used herein.

The protein of the present invention may be selected from the group consisting of edible proteins able to form a casing by gelling (coagulation and/or precipitation; whether or not in the presence of a coagulating agent) after co-extrusion. A particular preferred protein comprises collagen.

The polymer comprised in the hybrid casings of the present invention may be selected form the group consisting of edible polymers able to form a casing in combination with the protein present in the hybrid casing. Preferably the polymer is selected from the group consisting of polysaccharides. A preferred polymer may comprise alginate and/or cellulose.

As already mentioned above, the flow of co-extruded food products may include a strand of co-extruded food product, which strand of co-extruded food product still needs to be divided into separated individual food products (i.e. sausages). The flow of food products may include an intermediate form of a strand wherein the individual food products are still linked to each other (head-tail connection) to form a string of linked food products.

The single multiphase process step of the present invention may comprise at least two thermal treating steps. However, further thermal treating steps may be applied to the flow of food products as well. For example, in a further preferred embodiment the flow of food products may be subsequently subjected, i.e. after subjecting the flow of food products to the first and second thermal treating step, to a third thermal treating step. Even four or further subsequent thermal treating steps may be applied as well. Typically, the single multiphase process step may be configured to include about six thermal treating steps. It is noted that the configuration of the thermal treating step of step b) depends on the specific food product to be produced and the product line design the method is applied to. For example, for one product the thermal treating step may comprise four thermal treating steps, such as drying, heating, partially cooking and (fully) cooking, whereas for another product the thermal treating step may comprise three thermal treating steps, wherein the product leaving the single multiphase process step is only partially cooked.

The thermal treating step of step b) may be selected from the group consisting of drying, heating, partially cooking, cooking, and cooling the flow of food products. As used herein the term "drying" refers to a process step wherein an excess of water or moisture is removed from the surface of the flow of food products and wherein coagulation of the casing and/or cooking of the food dough is prevented.

As used herein the term "heating" refers to a process step wherein the casing coagulates, although the food dough is not cooked.

As used herein the term "partially cooking" refers to a process step wherein the food dough is cooked only partially, i.e. resulting in a food product not yet readily edible; still needs to be cooked further, e.g. in a further post-multiphase treating step or by the end user during preparing the food product for eating.

As used herein the term "cooking" refers to a process step wherein the food dough is cooked resulting in a food product which is edible. An alternative term for a food product subjected to a cooking step is a "fully cooked" food product.

As used herein the term "cooling" refers to a process step wherein the temperature of the food product is reduced using a cooling medium, such as tap water typically having a temperature of about 10° C. to 15° C. or cold air.

As used herein the term "chilling" refers to a process step wherein the food product is subjected to a chilling medium, which is a medium (e.g. water), which is deliberately made colder.

As already stated above, different combinations of two or more thermal treating steps are available during the method of the present invention depending on the specific properties of the food product to be obtained, the starting materials used for producing the food product, the design of the production line the method is applied to, and other parameters. An example of such combination may relate to a method wherein the first thermal treating step comprises b.1) drying the flow of food products, and/or the second thermal treating step comprises b.2) at least partially cooking the flow of food products. Another example of such combination may relate to a method wherein the first thermal treating step comprises b.i) drying the flow of food products, the second thermal treating step comprises b.ii) heating the flow of food products, and/or the third thermal treating step comprises b.iii) at least partially cooking the flow of food products.

With regard to the process conditions of the thermal treating steps of the present invention, it is noted that the temperatures may range from 50° C. to 150° C., the relative humidity ranges from 0% to 100%, and the air velocity may range from 1 m/s to 10 m/s.

In a preferred embodiment the thermal treating step comprises drying the flow of food products at a temperature of between 50° ° C. to 80° ° C., preferably between 60° C. to 75° C. The relative humidity during drying the flow of food products may be up to 10%, preferably up to 5%.

With regard to heating the flow of food products, the thermal treating step may comprise a temperature of between 60° C. to 90° C., preferably between 70° C. and 80° C. The relative humidity during heating the flow of food products may be between 15% to 40%, and more preferably between 25% and 35%.

Partially cooking the flow of food products may include a temperature of between 70° C. to 100° C., and more preferred between 80° C. and 90° C. The relative humidity during partially cooking the flow of food products may be between 30% to 60%, preferably between 40% and 50%.

In a further embodiment the thermal treating step comprises cooking the flow of food products at a temperature of between 70° C. to 100° C., preferably between 80° C. to 90° ° C. The relative humidity during cooking the flow of food products may be between 60% to 80%, and more preferably between 65% and 75%.

In a more specific embodiment of the present invention, the method comprises a thermal treating step b) wherein the flow of food products is at least subsequently subjected to:
  drying the flow of food products at a temperature of between 70° C. and 80° C. at a relative humidity of up to 5%, preferably about 0%;
  heating the flow of food products at a temperature of between 75° C. to 85° C. at a relative humidity of between 25% to 35%, preferably about 30%; and
  partially cooking the flow of food products at a temperature of between 80° C. to 90° C. at a relative humidity of between 40% to 50%, preferably about 45%.

Optionally, the above more specific embodiment of the present invention may further comprises, after partially cooking the flow of food products, subjecting the flow of food products to the step of:
  cooking the flow of food products at a temperature of between 80° C. to 90° C. at a relative humidity of between 60% to 75%, preferably between 65% to 70%.

By providing a single one step multiphase thermal treating step according to the present invention, it was found that post-thermal treating steps may have a shorter timespan in order to arrive at the same food product having resembling quality and product performance. For example, due to the controlled and combined multiphase thermal treating steps, the core temperature of the food product leaving the thermal treating step b) and subjected to a cooking step is higher compared to the core temperature of food products having been subjected to a cooking step of the methods disclosed in the art, i.e. methods wherein the (same) thermal treating steps are not combined into a single multiphase process step, but performed separately throughout the process of preparing the food products. By providing food products having a significantly increased core temperature, the post-thermal treatment of step c) may include surface treating the flow of food products by subjecting the flow of food products to steam, i.e. antimicrobial treatment of the surface of the flow of food products.

Another post-thermal treatment may comprise the step of cooking the flow of food products, in particular the step of cooking the food products after packing the food products. Such so called 'cook-in-pack' method has been found in particular beneficial is combining packing and fully cooking the food products.

The method of the present invention may further comprise the step of separating the strand of co-extruded food product into individual food products. As already mentioned above, the flow of food products may comprises a strand of co-extruded food product and wherein the method of the present invention further comprises the step of:
  before subjecting the flow of food products to step b), separating the strand of co-extruded food product into individual food products.

Although the strand of co-extruded food product may be divided into individual food products throughout the process, it is preferred that the step of separating the strand of co-extruded food product after subjecting the strand of co-extruded food product to the strengthening step of step a).

Further, the surface treating step may further comprises the step of applying liquid smoke to the flow of food products. Preferably, the liquid smoke is applied to the flow of food products after subjecting the flow of food products to a food product strengthening step.

Such application of liquid smoke may be in particular relevant in case the single multiphase thermal treating step is selected such that the food product obtained after step b) is fully cooked. Alternatively or in addition to applying liquid smoke to the flow of food products, the method of the present invention may comprise the step of:
  prior to co-extruding the flow of food products, adding a crosslinking agent to the casing.

Preferably the crosslinking agent is added to the casing shortly before co-extruding the casing and the food dough to form a flow of food products. Typically, before co-extrusion the casing is in the form of a gel or other viscous form. It was found that in order to provide fully cooked food products after thermally treating the flow of food products in step b), the presence of a crosslinking agent in the casing during co-extrusion of the flow of food products is highly desirable in order to maintain the desired surface characteristics.

In another aspect, the present invention relates to a production line for applying the method of the present invention. In a preferred embodiment of the present invention the production line for in-line processing of food products, comprises a food transport path for transporting the co-extruded food products, and a co-extrusion unit for extruding a food dough into a flow of co-extruded food products having a casing that comprises a protein, or a hybrid casing of a protein and a polymer, wherein the food transport path successively leads through:
- A) a surface treating unit comprising a strengthening unit for subjecting the flow of co-extruded food products to a food product strengthening step;
- B) a climate unit for subjecting the flow of food products to a thermal treating step; and
- C) optionally, a post-thermal treatment unit for subjecting the flow of food products to a post-thermal treating step, said post-thermal treating treatment is selected from the group consisting of chilling, surface treating, cooking and packing the flow of food products, and wherein the climate unit is configured to at least subsequently subjecting to a first thermal treating step, a second thermal treating step, and, optionally, one or more further thermal treating steps.

The surface treating unit may further comprise a liquid smoke unit for applying liquid smoke to the flow of food products. In a preferred embodiment of the present invention the surface treating unit is designed such that the food transport path successively leads through the strengthening unit followed by the liquid smoke unit.

The invention claimed is:

1. A method for in-line processing of food products, the method comprising the step of co-extruding a food dough into a flow of co-extruded food products having a casing that comprises a protein, or a hybrid casing of a protein and a polymer,
wherein the step of co-extruding the food dough into the flow of co-extruded food products includes maintaining a physical state of the protein in a crystalline form,
wherein the method subsequently comprises the successive steps of:
- a) subjecting the flow of co-extruded food products to a surface treating step, said surface treating step comprises the step of subjecting the flow of food products to a food product strengthening step and subsequently applying liquid smoke to the flow of food products;
- b) subjecting the flow of food products obtained in step a) to a first thermal treating step, including drying the flow of food products, and a second thermal treating step; and
- c) optionally, subjecting the thermally treated flow of food products to a post-thermal treating step, said post-thermal treating step is selected from the group consisting of chilling, surface treating, cooking and packing the flow of food products.

2. The method according to claim 1, wherein the flow of food products is subjected to the second thermal treating step when a surface temperature of the food products is at least about 55° C.

3. The method according to claim 1, wherein in step b) the flow of food products is subsequently subjected to a third thermal treating step.

4. The method according to claim 1, wherein in step b) the flow of food products is subsequently subjected to one or more subsequent separate thermal treating steps.

5. The method according to claim 1, wherein the thermal treating step is selected from the group consisting of drying, heating, partially cooking, cooking, and cooling the flow of food products.

6. The method according to claim 1, wherein the first thermal treating step comprises b.1) drying the flow of food products, and/or the second thermal treating step comprises b.2) at least partially cooking the flow of food products.

7. The method according to claim 2, wherein the first thermal treating step comprises b.i) drying the flow of food products, the second thermal treating step comprises b.ii) heating the flow of food products, and/or a third thermal treating step comprises b.iii) at least partially cooking the flow of food products.

8. The method according to claim 1, wherein the thermal treating step comprises drying the flow of food products at a temperature of [50, 80]° C., at a relative humidity of up to 10%.

9. The method according to claim 1, wherein the thermal treating step comprises heating the flow of food products at a temperature of [60, 90]° C., at a relative humidity of [15, 40]%.

10. The method according to claim 1, wherein the thermal treating step comprises partially cooking the flow of food products at a temperature of [70, 100]° C., at a relative humidity of [30, 60]%.

11. The method according to claim 1, wherein the thermal treating step comprises cooking the flow of food products at a temperature of [70, 100]° C., at a relative humidity of [60, 80]%.

12. The method according to claim 1, wherein in step b) the flow of food products is at least subsequently subjected to:
drying the flow of food products at a temperature of [70, 80]° C. at a relative humidity of up to 5%;
heating the flow of food products at a temperature of [75, 85]° C. at a relative humidity of [25, 35]%; and
partially cooking the flow of food products at a temperature of [80, 90]° C. at a relative humidity of [40, 50]%.

13. The method according to claim 12, wherein the method further comprises, after partially cooking the flow of food products, subjecting the flow of food products to the step of:
cooking the flow of food products at a temperature of [80, 90]° C. at a relative humidity of [60, 75]%.

14. The method according to claim 1, wherein in step c) the step of surface treating the flow of food products comprises subjecting the flow of food products to steam.

15. The method according to claim 1, wherein in step c) the step of cooking the flow of food products comprises cooking the food products after packing the food products.

16. The method according to claim 1, wherein the flow of food products comprises a strand of co-extruded food product and wherein the method further comprises the step of:
before subjecting the flow of food products to step b), separating the strand of co-extruded food product into individual food products, separating the strand of co-extruded food product obtained in step a).

17. The method according to claim 1, further comprising the step of subjecting the flow of food products to a brine solution.

18. The method according to claim 1, wherein the surface treating step is defined as a treating step of a surface of the food products and is devoid of thermal treatment and drying treatment.

19. The method according to claim 1, wherein the thermal treating step is defined as a treating step that actively heats or cools the food products during the in-line processing of food products.

* * * * *